Jan. 15, 1963  J. F. YATSKO  3,073,025
CLIPPING ATTACHMENT FOR HEDGE TRIMMER
Filed March 27, 1962
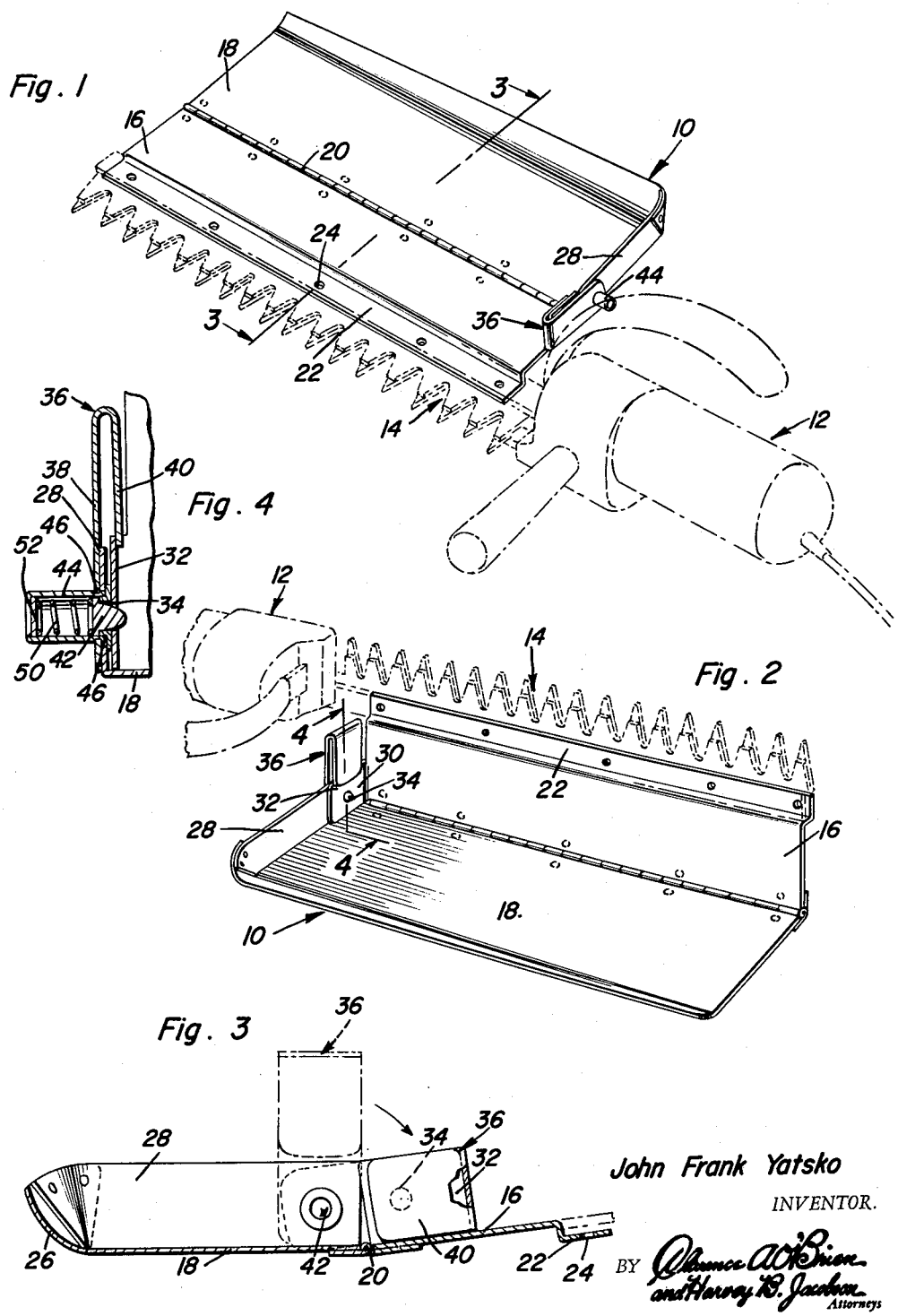
John Frank Yatsko
INVENTOR.

United States Patent Office 3,073,025
Patented Jan. 15, 1963

3,073,025
CLIPPING ATTACHMENT FOR HEDGE TRIMMER
John Frank Yatsko, 23 Railroad St., Wilkes-Barre 56, Pa.
Filed Mar. 27, 1962, Ser. No. 182,737
10 Claims. (Cl. 30—132)

This invention comprises a novel and useful clipping attachment for hedge trimmers and more particularly pertains to an attachment adapted to be mounted upon a power operated hedge trimmer for collecting and accumulating hedge clippings resulting from the use of the trimmers and which attachment is adjustable to selectively provide a horizontally extending shelf for accumulating the clippings when the trimmers are used in either a horizontal position or a vertical position.

The present invention relates to a clipping attachment for hedge trimmers which is of somewhat similar construction to but constitutes an improvement over the Clipper Catcher for Power Hedge Trimmers set forth and claimed in my prior Patent No. 2,747,276 of May 29, 1956.

The primary object of this invention is to provide an attachment capable of being readily applied to conventional constructions of hedge clippers of the type including a power operated sickle blade assembly and which attachment includes a pair of hingedly connected plates, one of which serves to secure the attachment to the sickle blade assembly and comprises a clipping receiving shelf and the other plate is hingedly connected to the base plate and is movable into and releasably lockingly secured in selected positions comprising a coplanar extension of the base to provide an extension of the clipper receiving surface of the latter or to project at right angles from the base and provide a clipping catching shelf extending perpendicular from the base.

A further and more specific object of the invention resides in the provision of an improved means for securing the two plates together and for effecting cooperation between the plates for mounting the same upon hedge trimmers, and for adjustably locking the plates in either of their two pivoted positions.

A still further object of the invention is to provide a clipping attachment in accordance with the foregoing objects having improved means for releasably and lockingly retaining an extension plate which is pivoted to a base plate in either a coplanar relation or a perpendicular relation with regard thereto.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing the clipping accumulator attachment of this invention with the extension plate in coplanar relation to the base plate and with the attachment mounted upon the sickle blade assembly of a power operated hedge trimmer with the latter being shown in dotted lines therein;

FIGURE 2 is a view similar to FIGURE 1 but showing the position of the pivoted plates of the attachment with the plates being disposed in a perpendicular relation to each other;

FIGURE 3 is a detail view in vertical transverse section taken substantially upon the plane indicated by the section line 3—3 of FIGURE 1 with an alternative position of a locking means being shown in dotted lines therein parts being broken away with certain concealed parts being shown in dotted lines; and FIGURE 4 is a detail view in vertical longitudinal section taken substantially upon the plane indicated by the section line 4—4 of FIGURE 2 and showing the locking means in the other position of the attachment.

In the accompanying drawings the numeral 10 designates generally the preferred embodiment of the clipping accumulator attachment of this invention which has been illustrated as applied to the hedge trimmer including a power operating means such as electric motor 12 and which latter is drivingly connected to a sickle blade assembly of conventional design indicated by the numeral 14. Inasmuch as the details of the power operated hedge clipper assembly are well known and the invention set forth and claimed hereinafter is not limited to any particular construction of the latter a further description of the hedge trimmer and its construction is deemed to be unnecessary to an understanding of the invention and has been omitted as being superfluous.

The attachment itself is of relatively simple inexpensive construction consisting of a pair of flat plates pivotally and hingedly connected together adapted to be mounted upon the sickle blade assembly 14. The plates may be of any suitable construction such as sheet metal or the like. Preferably, the attachment includes a base or mounting plate 16 which is pivotally and hingedly connected to an extension plate 18 along the coterminus, coextensive straight marginal edges of the two plates by means of a piano hinge 20. The base plate 16 includes a flat strip-like marginal portion 22 which is flat and laterally offset from the plane of the base plate 16 to provide a mounting flange which is apertured as at 24 to receive suitable fasteners such as rivets, screws or the like whereby the mounting flange and thus the base plate 16 is fixedly secured to the frame of the sickle blade assembly 14. It will be observed that the planes of the flange 22 and of the base plate 16 are disposed generally parallel to the plane in which the teeth of the sickle blade assembly operate.

The extension plate 18 upon its opposite longitudinal marginal edge from that to which the hinge 20 is secured is provided with an upturned side wall 26. At one end the two plates are provided with transversely extending aligned end walls such as the end wall 28 of the extension plate 18 which may extend across the entire width of this extension plate and the end wall 30 of the base plate 16 and which may extend through any desired portion of the transverse width of that plate. These end walls serve the dual functions of stiffening the thin sheet material of the two plates, as well as providing means by which a locking device may be mounted upon the plate of a construction to be now set forth.

The locking means to be now described constitutes a fastener which enables the two plates 16 and 18 to be releasably secured in either a coplanar position as shown in FIGURE 1 whereby the extension 18 forms an enlargement of the clipping surface of the base plate 16 when the sickle blade assembly is in a horizontal position during operation, and a perpendicular position of the two plates as shown in FIGURE 2 and in which the base plate 16 comprises a side wall for the collecting surface of the extension plate 18 when the sickle blade assembly is operated in a vertical position.

In order to retain the two plates in their coplanar extended position, the locking means includes a perpendicular upwardly projecting portion 32 rising from the end wall 30 of the base plate 16 and which is apertured as at 34. Pivotally connected to the end wall 28 of the extension plate 18 is a generally U-shaped sheet metal clip indicated generally by the numeral 36. This clip includes a relatively long leg 38 together with a parallel relatively short leg 40. The clip is thus swingable about its pivot to be subsequently described between the full line position of FIGURE 3 in which the clip is engaged about the locking projection 32 to thereby limit and restrain swinging movement of the two sections away from each other to a coplanar position as shown in FIGURES 1 and 3, and a raised releasing position shown in dotted lines of FIGURE 3 and in FIGURES 2 and 4 in which the clip is disengaged from the projection. In order to releasably lock and secure the two sections in their mutually perpendicular position shown in FIGURES 2 and 4, a further locking means is provided. This further means includes a spring pressed detent 42 engageable in the aperture 34, the detent being carried by the end wall and the clip portion 38 as shown in FIGURE 4.

There is thus provided a cylindrical body 44 having a diametrically reduced external groove 46 which is received in an aperture 46 in the clip portion 38, and a further aperture in the end wall 28 of the extension plate 18, so as to secure these members together and permit pivoting of the clip upon this end wall. The body 44 is hollow and contains a compression spring 50 engaging against the detent member 42 and a seating member 52 in the open outer end of the body 44 to yieldingly urge the detent member through the aperture 34 for locking engagement therewith when the detent and the aperture are in alignment. There is thus provided cooperating members each carried by one of the plates which are engageable to releasably secure the plates in their perpendicular position of adjustment.

It will be further observed that both of the locking means are secured at the same portion of the plates and at the hinged connection of the plates at one end thereof.

There is thus provided a very simple construction which enables the extension plate of the clipping accumulator attachment to be readily adjusted between a coplanar and a perpendicular position to thereby enable the attachment and the hedge trimmer to be readily used in either a horizontal or vertical position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A clipping accumulator attachment for hedge trimmers of the type including a sickle blade assembly operatively mounted upon and driven by an electric motor, said attachment comprising a flat base plate, means rigidly mounting said plate upon said sickle blade assembly, a flat extension plate, a hinge pivotally connecting adjacent edges of said plates for swinging movement of said extension plate relative to said base plate to position in a pair of planes which are respectively common to and are perpendicular to that of said base plate whereby said extension plate may selectively and respectively extend the clipping holding area of the base plate and provide a clipping holding surface perpendicular to the latter when the base plate is horizontally disposed, a locking means secured to one plate and engaging the other for selectively securing said plates in coplanar and mutually perpendicular positions, said locking means being disposed solely at one end of said plates and at their pivoted connection.

2. The combination of claim 1 including transverse upstanding aligned marginal end walls on said plates, said locking means being mounted on said end walls.

3. The combination of claim 1 wherein said plates have longitudinally extending straight coextensive and unbroken adjacent edges.

4. The combination of claim 3 including transverse upstanding aligned marginal end walls on said plates, said locking means being mounted on said end walls.

5. The combination of claim 1 wherein said mounting means comprises a flat marginal laterally offset portion of said base plate, fasteners securing said marginal portion to said sickle blade assembly.

6. The combination of claim 1 wherein said mounting means comprises a flat marginal laterally offset portion of said base plate, fasteners securing said marginal portion to said sickle blade assembly, transverse upstanding aligned marginal end walls on said plates, said locking means being mounted on said end walls.

7. The combination of claim 1 wherein said locking means includes a holding projection upon one plate and extending perpendicularly to the plane of the latter, a cooperating locking clip on the other plate.

8. The combination of claim 7 wherein said locking means further includes a resilient latch on one plate and a cooperating detent on the other plate for releasably retaining said plates in one of said positions.

9. The combination of claim 8 wherein said resilient latch is mounted upon said other plate and extends through said locking clip.

10. The combination of claim 1 wherein said locking means includes a resilient latch on one plate and a cooperating detent on the other plate for releasably retaining said plates in one of said positions.

References Cited in the file of this patent

UNITED STATES PATENTS

| | | |
|---|---|---|
| 2,281,189 | Wright | Apr. 28, 1942 |
| 2,510,311 | Greene | June 6, 1950 |
| 2,633,636 | Szostek | Apr. 7, 1953 |
| 2,747,276 | Yatsko | May 29, 1956 |